(12) United States Patent
Saito et al.

(10) Patent No.: US 7,622,837 B2
(45) Date of Patent: Nov. 24, 2009

(54) HYDRODYNAMIC BEARING DEVICE AND SPINDLE MOTOR HAVING THE BEARING DEVICE, AND RECORDING AND/OR REPRODUCING APPARATUS USING THE SPINDLE MOTOR

(75) Inventors: Hiroaki Saito, Ehime (JP); Takeyoshi Yamamoto, Ehime (JP); Takao Yoshitsugu, Ehime (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 11/407,060

(22) Filed: Apr. 20, 2006

(65) Prior Publication Data
US 2006/0255675 A1  Nov. 16, 2006

(30) Foreign Application Priority Data
Apr. 21, 2005  (JP) ............... P2005-124328

(51) Int. Cl.
H02K 5/16  (2006.01)
(52) U.S. Cl. ........................... 310/90; 310/67 R
(58) Field of Classification Search ............... 310/67 R, 310/90
See application file for complete search history.

(56) References Cited

U.S. PATENT DOCUMENTS

| 5,791,785 | A | * | 8/1998 | Nose et al. ............. 384/119 |
| 5,969,448 | A | * | 10/1999 | Liu et al. ............... 310/90 |
| 6,034,454 | A | * | 3/2000 | Ichiyama ............... 310/90 |
| 6,307,291 | B1 | * | 10/2001 | Iwaki et al. ............ 310/90 |
| 6,316,857 | B1 | * | 11/2001 | Jeong .................. 310/90 |
| 6,456,458 | B1 | | 9/2002 | Ichiyama |
| 6,914,358 | B2 | * | 7/2005 | Tokunaga et al. ........ 310/90 |
| 6,922,309 | B2 | * | 7/2005 | Kayama et al. ......... 360/99.08 |
| 7,215,508 | B2 | * | 5/2007 | Ishikawa et al. ....... 360/99.08 |
| 7,218,023 | B2 | * | 5/2007 | Hirose et al. .......... 310/90 |
| 2006/0002011 | A1 | | 1/2006 | Yamamoto et al. |

FOREIGN PATENT DOCUMENTS

| JP | 2000-215589 | 8/2000 |
| JP | 2003-092867 | 3/2003 |

OTHER PUBLICATIONS

English Language Abstract of JP 2000-215589.
English Language Abstract of JP 2003-092867.

* cited by examiner

*Primary Examiner*—Thanh-Tam T Le
(74) *Attorney, Agent, or Firm*—Greenblum & Bernstein P.L.C.

(57) ABSTRACT

A set of radial dynamic pressure generating grooves constitute a radial bearing, and an entire width (L) of the radial dynamic pressure generating groove is reduced. A set of thrust dynamic pressure generating grooves constituting a thrust bearing are formed so that an area where a maximal thrust dynamic pressure is generated (diameter) is increased, and a bearing angle stiffness of the thrust bearing is increased. The thrust bearing having the high bearing angle stiffness shares a moment load applied to a shaft to thereby compensate for a bearing angle stiffness of the radial bearing whose bearing stiffness is small because an entire width of the radial bearing is small. Thus, a thin-shaped hydrodynamic bearing capable of withstanding a large moment load is obtained.

19 Claims, 5 Drawing Sheets

HYDRODYNAMIC BEARING DEVICE AND SPINDLE MOTOR HAVING THE BEARING DEVICE, AND RECORDING AND/OR REPRODUCING APPARATUS USING THE SPINDLE MOTOR

BACKGROUND OF THE INVENTION

1. Field of the Invention

The present invention relates to a thin-shaped hydrodynamic bearing for supporting a shaft by a dynamic pressure generated in lubricating fluid, and to a spindle motor having such a hydrodynamic bearing for use in such as a recording and/or reproducing apparatus.

2. Description of the Related Art

A hydrodynamic bearing (or referred to as "fluid dynamic bearing" hereinafter) is conventionally widely used as a bearing for a spindle motor for driving a recording disk in a small-size information recording apparatus such as a hard disk drive. In recent years, there is a growing demand for reducing a hard disk drive in size and thickness. In order to achieve this demand, a spindle motor for driving a disk is also requested to be downsized and thinned. Therefore, it is necessary to reduce an axial dimension of a hydrodynamic bearing used in a spindle motor. Conventionally, a hydrodynamic bearing has generally two sets of radial dynamic pressure generating grooves formed therein. For improvement thereof, in order to obtain a hydrodynamic bearing having a smaller axial dimension, only one set of such radial dynamic pressure generating grooves are formed in a radial bearing for radially supporting a shaft, so that an axial length of the radial bearing is reduced. The Japanese Patent Publication No. 3424739 (Document D1) discloses a conventional motor which includes a hydrodynamic bearing of the foregoing type having only one set of radial dynamic pressure generating grooves. Meanwhile, the Japanese Patent Unexamined Laid-open Publication No. 2003-92867 (Document D2) discloses another conventional hydrodynamic bearing which has two sets of short radial dynamic pressure generating grooves formed therein. In this Document D2, the two sets of short radial dynamic pressure generating grooves are interspaced from each other between a sleeve and a shaft.

As a thickness of a motor is reduced, a rotor is generally reduced in weight, and a magnitude of disturbance is accordingly reduced. Therefore, a radial bearing stiffness demanded by a radial loading capacity is reduced as the motor is thinner. As far as the viewpoint mentioned above is concerned, it is easy to reduce the axial length of the radial bearing. However, the reduction of the bearing in length causes the following problems.

A radius of a recording disk mounted on a spindle motor is significantly larger than a radius of a bearing of the spindle motor in general. Further, the radius of the disk is significantly larger than an axial length (thickness) of the bearing. Therefore, when a recording head tracks an outer peripheral of the disk, a force acting to make the shaft tilted is applied to the shaft. This force is referred to as "moment load". When the applied moment load exceeds a level which the hydrodynamic bearing can withstand, the shaft and the sleeve are in contact with each other to cause a vibration and vary a rotational speed of the motor, and further the shaft and the sleeve are worn away. It is noted here that a property of the hydrodynamic bearing which can withstand the moment load is referred to as "bearing angle stiffness". The hydrodynamic bearing having a high bearing angle stiffness can withstand a large moment load.

SUMMARY OF THE INVENTION

A main object of the present invention is to provide a thin-shaped hydrodynamic bearing having a high bearing angle stiffness.

A first aspect of the present invention as claimed in Claim 1 provides a hydrodynamic bearing device which comprises: a sleeve having a bearing hole constituting a radial bearing; a shaft inserted to the bearing hole so as to be rotatable relative to the sleeve; a flange secured to the shaft and having a surface part facing one end surface of the sleeve near around the bearing hole, wherein said facing surfaces of the flange and the sleeve are perpendicular to a central axis of the shaft to constitute a thrust bearing; and a lubricating fluid filled in the bearing hole and a gap between the end surface of the sleeve and the flange.

In this construction, at least one of an inner surface of the bearing hole and an outer surface of the shaft has radial dynamic pressure generating grooves each having a herringbone shape formed therein so as to generate a radial dynamic fluid pressure having a distribution of a substantially triangular shape such that the pressure of the lubricating fluid is maximized at bended portions of the herringbone shapes and gradually reduced toward both ends of the herringbone shapes of the grooves.

The flange has thrust dynamic pressure generating grooves each having a spiral shape formed in the surface thereof facing said one end surface of the sleeve so as to generate a thrust dynamic fluid pressure having a distribution of a substantially trapezoidal shape such that the pressure of the lubricating fluid is high in a region defined by an inner periphery of the grooves and including a vicinity of an inner periphery of the flange and a shaft portion therein and that the pressure is gradually reduced toward an outer periphery of the grooves near an outer periphery of the flange.

According to the first aspect of the present invention, only a set of radial dynamic pressure generating grooves forming a radial bearing are provided, which serves to shorten an axial length of the hydrodynamic bearing to reduce a thickness thereof. Further, a flange having a large diameter in comparison to the axial length is used as the flange in which the thrust dynamic pressure generating grooves are provided so that the thrust dynamic pressure generating grooves which distribute a thrust dynamic pressure in the trapezoidal shape are provided in the flange. Accordingly, a bearing angle stiffness of the thrust dynamic pressure generating grooves in the flange can be increased, and the shaft can be preventing from tilting against a moment load generated as a head traces a disk and by a radial loading capacity.

A second aspect of the present invention as claimed in Claim 3 provides a hydrodynamic bearing device which comprises: a sleeve having a bearing hole constituting a radial bearing; a shaft inserted to the bearing hole so as to be rotatable relative to the sleeve; a flange secured to the shaft and having a surface part facing one end surface of the sleeve near around the bearing hole, wherein said facing surfaces of the flange and the sleeve are perpendicular to a central axis of the shaft to constitute a thrust bearing; and a lubricating fluid filled in the bearing hole and a gap between the end surface of the sleeve and the flange.

In this construction, at least one of an inner surface of the bearing hole and an outer surface of the shaft has radial dynamic pressure generating grooves each having a herringbone shape formed therein so as to generate a radial dynamic fluid pressure having a distribution of a substantially triangular shape such that the pressure of the lubricating fluid is maximized at bended portions of the herringbone shapes and gradually reduced toward both ends of the herringbone shapes of the grooves.

The flange has thrust dynamic pressure generating grooves each having a herringbone shape formed in the surface thereof facing said one end surface of the sleeve so as to generate a thrust dynamic fluid pressure having a distribution of an annular shape with a substantially triangular shape in section such that the pressure of the lubricating fluid is maximized at bended portions of the herringbone shapes of the grooves between said one end surface of the sleeve and the flange and gradually reduced toward both ends of the herringbone shapes of the grooves According to the second aspect of the present invention, only a set of radial dynamic pressure generating grooves forming a radial bearing are provided, which serves to shorten an axial length of the hydrodynamic bearing to reduce a thickness thereof. Further, a flange having a large diameter in comparison to the axial length is used as the flange in which the thrust dynamic pressure generating grooves are provided so that the thrust dynamic pressure generating grooves which distribute the thrust dynamic pressure in the annular shape substantially triangular are provided in the flange. Accordingly, a bearing angle stiffness of the thrust dynamic pressure generating grooves in the flange member can be increased, and the shaft can be preventing from tilting against the moment load generated as the head traces the disk and by the radial loading capacity.

A third aspect of the present invention as claimed in Claim 5 provides a hydrodynamic bearing device which comprises: a sleeve having a bearing hole constituting a radial bearing; a shaft inserted to the bearing hole so as to be rotatable relative to the sleeve; a flange secured to the shaft and having a surface part facing one end surface of the sleeve near around the bearing hole, wherein said facing surfaces of the flange and the sleeve are perpendicular to a central axis of the shaft to constitute a thrust bearing; and a lubricating fluid filled in the bearing hole and a gap between the end surface of the sleeve and the flange.

In this construction, at least one of an inner surface of the bearing hole and an outer surface of the shaft has a pair of first and second groups of a plurality of radial dynamic pressure generating grooves, said first and second groups being apart from each other by a space region, wherein said radial dynamic pressure grooves of the first group are formed in parallel with each other and tilted in a predetermined direction and said radial dynamic pressure generating grooves of the second group are formed in parallel with each other and tilted in a direction reverse to the tilting direction of the first group, so that a radial dynamic fluid pressure having a distribution of a substantially trapezoidal shape is generated such that the pressure of the lubricating fluid between the inner surface of the bearing hole and the outer surface of the shaft is constantly high in the space region in an axial direction and is gradually reduced toward the both ends thereof.

The flange has thrust dynamic pressure generating grooves each having a spiral shape formed in the surface thereof facing said one end surface of the sleeve, so that a thrust dynamic fluid pressure having a distribution of a substantially trapezoidal shape is generated such that the pressure of the lubricating fluid is constantly the highest in a region defined by an inner periphery of the grooves and including a vicinity of an inner periphery of the flange and a shaft portion therein and that the pressure is gradually reduced toward an outer periphery of the grooves near an outer periphery of the flange.

According to the third aspect of the present invention, only a set of radial dynamic pressure generating grooves forming a radial bearing are provided, which serves to shorten an axial length of the hydrodynamic bearing to reduce a thickness thereof. Further, a flange having a large diameter in comparison to the axial length is used as the flange in which the thrust dynamic pressure generating grooves are provided so that the thrust dynamic pressure generating grooves which distribute the thrust dynamic pressure in the substantially trapezoidal shape are provided in the flange. Accordingly, a bearing angle stiffness of the thrust dynamic pressure generating grooves in the flange can be increased, and the shaft can be preventing from tilting against the moment load generated as the head traces the disk and by the radial loading capacity.

A fourth aspect of the present invention as claimed in Claim 7 provides a hydrodynamic bearing device which comprises: a sleeve having a bearing hole constituting a radial bearing; a shaft inserted to the bearing hole so as to be rotatable relative to the sleeve; a flange secured to the shaft and having a surface part facing one end surface of the sleeve near around the bearing hole, wherein said facing surfaces of the flange and the sleeve are perpendicular to a central axis of the shaft to constitute a thrust bearing; and a lubricating fluid filled in the bearing hole and a gap between the end surface of the sleeve and the flange.

In this construction, at least one of an inner surface of the bearing hole and an outer surface of the shaft has a pair of first and second groups of a plurality of radial dynamic pressure generating grooves, said first and second groups being apart from each other by a space region, wherein said radial dynamic pressure grooves of the first group are formed in parallel with each other and tilted in a predetermined direction and said radial dynamic pressure generating grooves of the second group are formed in parallel with each other and tilted in a direction reverse to the tilting direction of the first group, so that a radial dynamic fluid pressure having a distribution of a substantially trapezoidal shape is generated such that the pressure of the lubricating fluid between the inner surface of the bearing hole and the outer surface of the shaft is constantly high in the space region in an axial direction and is gradually reduced toward the both ends thereof.

The flange has thrust dynamic pressure generating grooves each having a herringbone shape formed in the surface thereof facing said one end surface of the sleeve so as to generate a thrust dynamic fluid pressure having a distribution of a substantially triangular shape such that the pressure of the lubricating fluid is maximized at bended portions of the herringbone shapes of the grooves between said one end surface of the sleeve and the flange and is gradually reduced toward both ends of the herringbone shapes of the grooves According to the fourth aspect of the present invention, only a set of radial dynamic pressure generating grooves forming a radial bearing are provided, which serves to shorten an axial length of the hydrodynamic bearing to reduce a thickness thereof. Further, a flange having a large diameter in comparison to the axial length is used as the flange in which the thrust dynamic pressure generating grooves are provided so that the thrust dynamic pressure generating grooves which distribute the thrust dynamic pressure in the annular shape substantially triangular are provided in the flange. Accordingly, a bearing angle stiffness of the thrust dynamic pressure generating grooves in the flange can be increased, and the shaft can be preventing from tilting against the moment load generated as the head traces the disk and by the radial loading capacity.

In the first and second aspects of the present invention, in the case of a spindle motor having a larger size than the small-sized motor, if it is possible to form a plurality of radial dynamic pressure generating grooves each having a herringbone shape in the radial bearing, the same effect as described above can be obtained by using a flange having a relatively large diameter.

According to the present invention, only a set of radial dynamic pressure generating grooves forming a radial bearing are provided, which serves to shorten the axial length of the hydrodynamic bearing to reduce the thickness thereof. Further, the flange having a relatively large diameter is used in which the thrust dynamic pressure generating grooves are formed so that the thrust dynamic pressure generating grooves which distribute the thrust dynamic pressure in the annular shape substantially triangular or in the substantially trapezoidal shape are provided in the flange. Accordingly, the bearing angle stiffness of the thrust dynamic pressure generating grooves in the flange can be increased, and the shaft can be preventing from tilting against the moment load generated as the head traces the disk and by the radial loading capacity. As a result, there can be obtained a thin-shaped hydrodynamic bearing attaining a high bearing stiffness.

DESCRIPTION OF THE PREFERRED EMBODIMENTS

Figure 1:
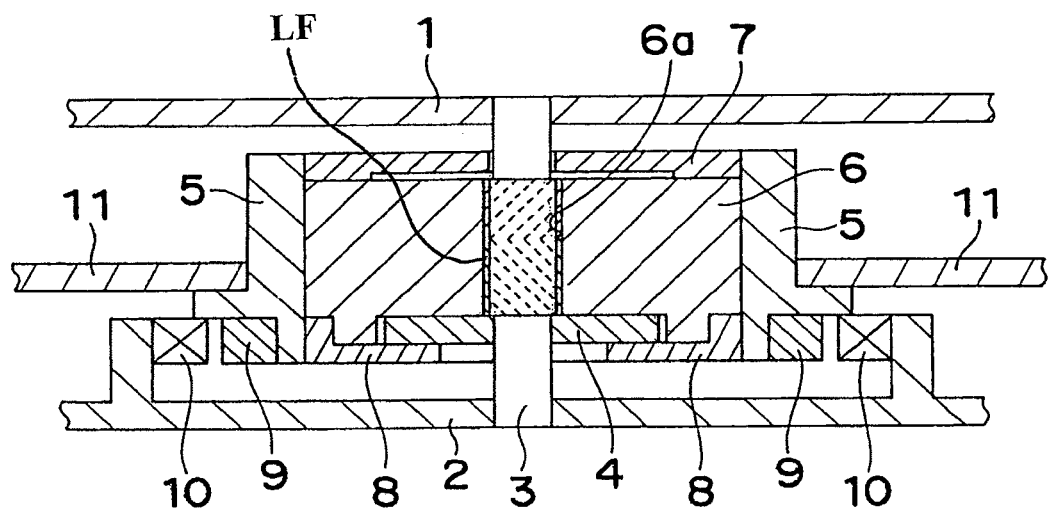
FIG. 1 is a sectional view of a spindle motor including a hydrodynamic bearing of a shaft-fixed type according to respective preferred embodiments in common of the present invention.

Hereinafter, preferred embodiments of a hydrodynamic bearing according to the present invention are described with reference to the attached drawings. FIG. 1 shows a sectional view of a spindle motor including a hydrodynamic bearing commonly applicable to the respective preferred embodiments of the present invention. The respective preferred embodiments described below are different to one another in shapes of a radial dynamic pressure generating groove and a thrust dynamic pressure generating groove formed in the hydrodynamic bearing.

Embodiment 1

FIG. 1 is a sectional view of a spindle motor which includes a thin-typed hydrodynamic bearing according to a preferred embodiment 1 of the present invention. In the drawing, a fixed shaft 3 is fixedly provided between a case cover 1 and a base member 2 which constitute a part of an information recording and/or reproducing apparatus. A flange 4 having a disk shape of a flange member is fixedly provided at a lower part of the fixed shaft 3. The fixed shaft 3 is inserted through a bearing hole 6a of a sleeve 6, so that the sleeve 6 is rotatable. A hub 5 is mounted on an outer periphery of the sleeve 6, so that the hub 5 and the sleeve 6 are integrally rotated. A recording medium 11, such as a magnetic disk, is attached to an outer peripheral part of the hub 5. A rotor magnet 9 is provided at a lower part of the hub 5, and a stator core 10 having a stator coil wound around the core is provided on the base member 2, and faces the rotor magnet 9. In this construction, a magnetic center of the rotor magnet 9 is positioned at an upper side in the drawing relative to a magnetic center of the stator core 10. Therefore, when the coil wound around the stator core 10 is electrically conducted, the rotor magnet 9 is subjected to a force directed downward by a magnetic attraction force. Thus, the sleeve 6 having the rotor magnet 9 attached thereto is also subjected to the force directed downward. An slip-out preventing member 8 is attached to a lower part of the sleeve 6 for preventing the sleeve 6 from slipping out of the fixed shaft 3. A sealing plate 7 is secured to an upper part of the sleeve 6, and a reservoir for a lubricating fluid (LF) such as oil, high liquidity grease or ionic liquid is formed in a space between the sleeve 6 and the sealing plate 7 so as to retain the lubricating fluid therein.

In this construction, radial dynamic pressure generating grooves are formed in at least one of the outer surface of the fixed shaft 3 and the inner surface of the sleeve 6 facing each other, which will be described in detail later. Moreover, thrust dynamic pressure generating grooves are formed in at least one of the upper surface of the flange 4 and the lower surface of the sleeve 6 facing each other, which will be described in detail later. The lubricating fluid, such as oil, is filled in a gap between the bearing hole 6a of the sleeve 6 and the fixed shaft 3 and a gap between the sleeve 6 and the flange 4, so that the sleeve 6 rotates without any contact with the fixed shaft 3 and the flange 4.

Figures 2A, 2B:
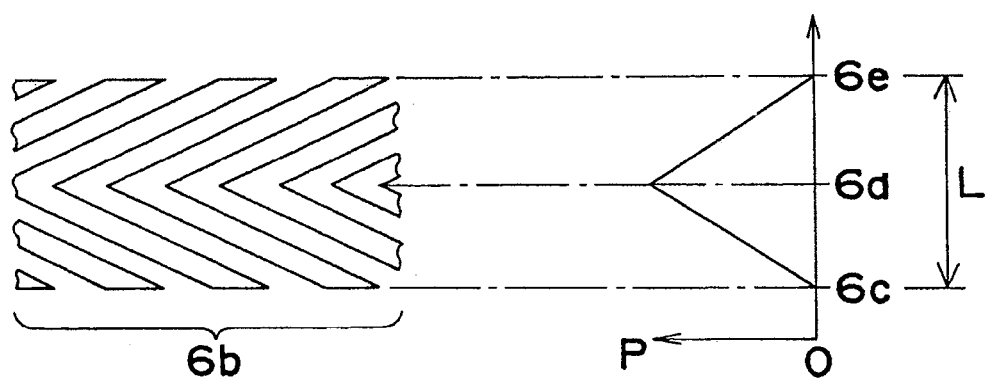
FIG. 2A is a plan view of radial dynamic pressure generating grooves formed in the hydrodynamic bearing according to a preferred embodiment 1 of the present invention.
FIG. 2B is a graph showing a pressure distribution in the hydrodynamic bearing shown in FIG. 2A.

FIG. 2A shows the radial dynamic pressure generating grooves 6b each having a herringbone shape, which are formed in an inner peripheral surface of the bearing hole 6a of the sleeve 6, wherein the radial dynamic pressure generating grooves 6b formed in the curved inner peripheral surface of the bearing hole 6a are shown in a planar manner. FIG. 2B is a graph showing a pressure distribution generated in the lubricating fluid in the bearing hole 6a by the radial dynamic pressure generating grooves 6b, wherein a horizontal axis denotes a pressure P and a vertical axis denotes an axial position of the radial dynamic pressure generating grooves 6b along the fixed shaft 3 upward from the lower position thereof in the drawing.

Figures 3A, 3B:
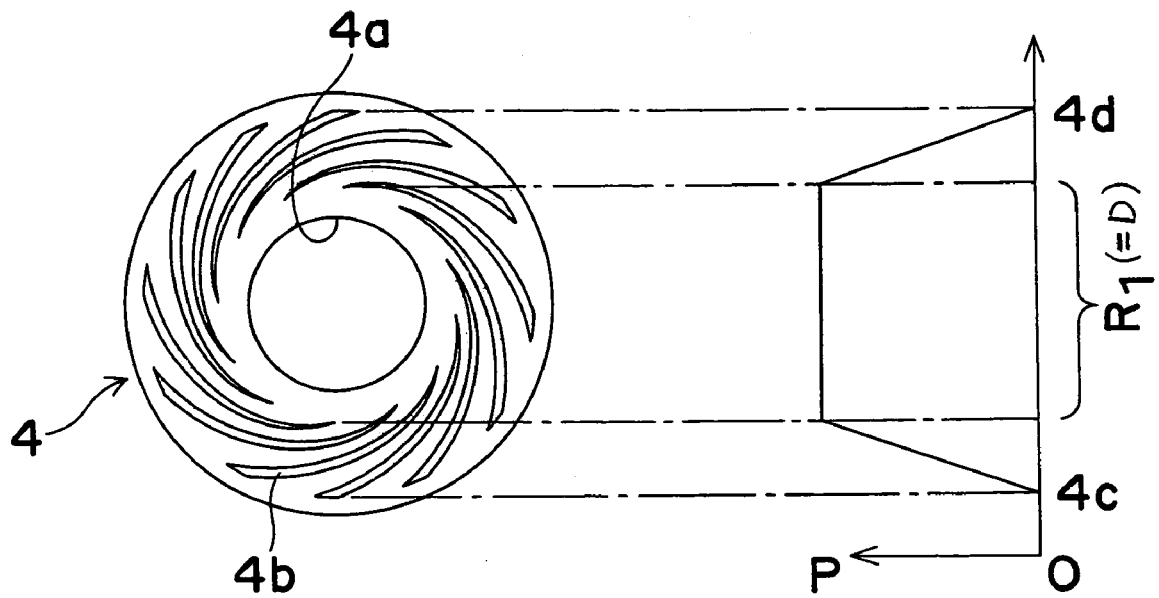
FIG. 3A is a plan view of thrust dynamic pressure generating grooves formed in the hydrodynamic bearing according to the preferred embodiment 1 of the present invention.
FIG. 3B is a graph showing a pressure distribution in the hydrodynamic bearing shown in FIG. 3A.

FIG. 3A is a plan view of the flange 4 having a hole 4a formed in a central portion thereof into which the fixed shaft is inserted. In the surface of the flange 4 facing the sleeve 6, the thrust dynamic pressure generating grooves 4b each having a spiral shape are formed. FIG. 3B shows a pressure distribution generated in the lubricating fluid between the sleeve 6 and the flange 4 by the thrust dynamic pressure generating grooves 4b, wherein a horizontal axis denotes a pressure P, and a vertical axis denotes a radial position of the flange 4.

In the hydrodynamic bearing according to the embodiment 1, in consequence of the radial dynamic pressure generating grooves 6b shown in FIG. 2A, there is obtained a pressure distribution of a substantially triangular shape such that the pressure is the highest at a central position 6d of the radial dynamic pressure generating grooves 6b and is the lowest at both end part positions 6c and 6e thereof, as shown in FIG. 2B. The pressure distribution allows the sleeve 6 to be retained without any contact with the fixed shaft 3 by the highest pressure of the lubricating fluid generated at the central part 6d.

The thrust dynamic pressure generating grooves 4b shown in FIG. 3A shows a pressure distribution of a substantially trapezoidal shape such that the pressure is constantly high at a central region R1 and gradually reduced toward both end parts 4c and 4d as shown in FIG. 3B. The lubricating fluid thus generates a high pressure in a relatively broad range of the central region R1 which includes a radial region of the fixed shaft 3. The sleeve 6 is subjected to a force directed upward by the pressure generated by the lubricating fluid between the sleeve 6 and the flange 4, and is subjected to a force directed downward by the magnetic attraction force caused by the rotor magnet 9. When the material of the base member 2 has magnetism, the magnetic attraction force is obtained between the rotor magnet 9 and the base member 2. As a result, the sleeve 6 rotates without any contact with the flange 4 and the fixed shaft 3. Since the lubricating fluid evenly shows the high pressure in the relatively broad range of the central region R1 between the flange 4 and the sleeve 6, the sleeve 6 is stably supported by the flange 4 with a high bearing stiffness. A bearing angle stiffness thereof is thereby significantly increased, and the increase of the bearing angle stiffness is further enhanced by a large diameter of the flange 4.

In consequence, the hydrodynamic bearing can be obtained while achieving a high bearing angle stiffness in the entire bearing. In the spindle motor shown in FIG. 1, since the fixed shaft 3 is supported at the both ends thereof, the high stiffness can be maintained even though a diameter of the fixed shaft is small. Therefore, an influence of a vibration or an impact applied thereto, if any, can be minimized.

In this construction, the dimension of the maximal-pressure range R1 (=D) of the thrust dynamic pressure generating grooves 4b shown in FIGS. 3A and 3B is preferably equal to or larger than the entire width L of the radial dynamic pressure generating grooves 6b shown in FIGS. 2A and 2B (i.e., R≧L).

In more detail, a bearing angle stiffness of a hydrodynamic bearing is generally regarded as a reaction force with respect to a tilt of a shaft, and it is preferable that a value of the reaction force is as large as possible. The value of the reaction force of the bearing (i.e., a total sum of pressures generated in the acting direction of the reaction force) may be regarded to be proportional to a projected area of the bearing. In other words, the total sum of the pressures distributed in the projected area of the bearing acts as the reaction force of the bearing.

If a spindle motor is downsized and thinned, an axial dimension of a hydrodynamic bearing is reduced so that the radial bearing is reduced in size. As a result, the bearing angle stiffness by the radial bearing is decreased.

Therefore, in order to supplement this decrement in bearing angle stiffness, the thrust bearing stiffness is increased by making the thrust bearing projected area larger than the radial bearing projected area, so that the sufficient bearing angle stiffness can be assured.

Assuming that, for example, the radial bearing has a shaft diameter of 3 mm and a width L of 4 mm which is regarded as a radial dimension and that the thrust bearing has an outer diameter D (=R1) of 4 mm which is regarded as a thrust dimension, when projected areas of the radial bearing and the thrust bearing are compared with each other, the projected area of the radial bearing is obtained by 3×4=12 mm² and the projected area of the thrust bearing is obtained by 2×2×π=12.6 mm². In this example, the thrust dimension D is equal to the radial dimension L (D=L=4 mm). Accordingly, when D=L, the projected area of the thrust bearing becomes larger than the projected area of the radial bearing. When D>L, the above relationship of the projected areas of the thrust and radial bearings is, of course, obtained.

Thus, when a spindle motor is downsized and thinned, it is effective means to make the thrust dimension equal to or larger than the radial dimension (D≧L). In this embodiment 1, the length L of the radial groove portion of the radial bearing is used as the radial dimension and the high pressure region R1 (=D) of the thrust groove portion of the thrust bearing is used as the thrust dimension, and the same effect as described above can be obtained.

It is noted here that, although the flange member and the hub member are different from each other in the embodiment, the flange portion may be formed of a part of the hub member having the same function as that of the flange as described above.

Embodiment 2

Figures 4A, 4B:
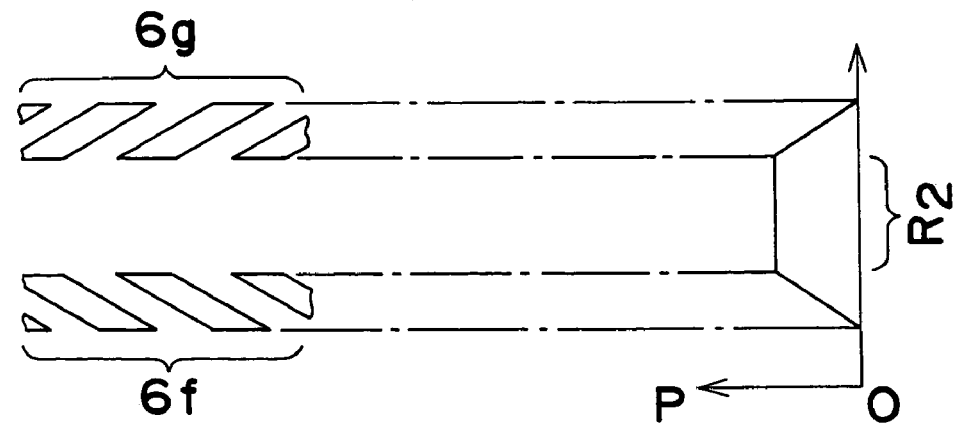
FIG. 4A is a plan view of radial dynamic pressure generating grooves formed in a hydrodynamic bearing according to a preferred embodiment 2 of the present invention.
FIG. 4B is a graph showing a pressure distribution in the hydrodynamic bearing shown in FIG. 4A.

A hydrodynamic bearing device according to a preferred embodiment 2 of the present invention is described referring to FIGS. 4A, 4B and 5A, 5B. In the hydrodynamic bearing according to the preferred embodiment 2, the radial dynamic pressure generating groove are comprised of a pair of upper and lower grooves shown in a developed view of FIG. 4A, and the thrust dynamic pressure generating groove has a shape shown in a top plan view of FIG. 5A. In FIG. 4A, radial dynamic pressure generating grooves 6g according to the preferred embodiment 2 are the upper-side grooves which are formed diagonally from lower left to upper right, while radial dynamic pressure generating grooves 6f are the lower-side grooves which are formed diagonally from upper left to lower right. The upper-side grooves and the lower-side grooves are apart from each other by a predetermined distance R2. FIG. 4B is a graph showing a pressure distribution in the lubricating fluid between the fixed shaft 3 and the bearing hole 6a of the sleeve 6 generated by the radial dynamic pressure generating grooves shown in FIG. 4A. As shown in the drawing, the pressure P shows a trapezoid distribution with a constantly high level in the central region R2 in an axial direction and is gradually lowered to be zero toward the both ends thereof.

Figures 5A, 5B:
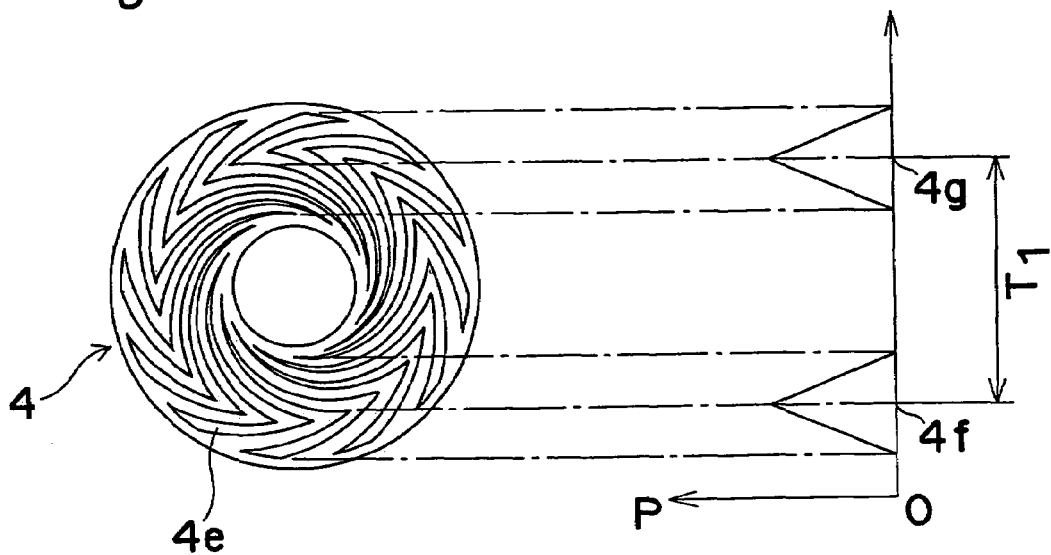
FIG. 5A is a plan view of thrust dynamic pressure generating grooves formed in the hydrodynamic bearing according to the preferred embodiment 2 of the present invention.
FIG. 5B is a graph showing a pressure distribution in the hydrodynamic bearing shown in FIG. 5A.

FIG. 5A is a plan view of thrust dynamic pressure generating grooves 4e each having a herringbone shape, which are formed in an upper surface of the flange 4. In the thrust dynamic pressure generating grooves 4e, the pressure becomes the highest at peaks of the herringbone shapes of the grooves. Therefore, in a pressure distribution shown in FIG. 5B, the pressure is the maximum at top positions 4f and 4g of generally triangle shapes of the distribution, wherein a pitch T1 denotes a diameter defined between the top positions 4f and 4g. That is, although FIG. 5B shows only the top positions 4f and 4g, the part having the maximal pressure has an annular shape in plan view on the flange surface with substantially triangular in section by continuation of the peaks of the herringbone shapes. The pressure becomes the lowest at the inner and outer peripherals of the annular shape region of the entire thrust dynamic pressure generating grooves 4e.

In the preferred embodiment 2, the annular high-pressure parts defined by continuation of the peaks of the herringbone-shape thrust dynamic pressure generating grooves shown in FIG. 5A, are generated in the surfaces of the flange 4 facing the sleeve 6. If the pitch T1 is equal to or larger than the distance R2, most of the moment load can be sustained by the flame member. Thus, the annular high-pressure parts stably support the sleeve 6, and the bearing angle stiffness of the thrust bearing is thereby significantly increased. As a result, the bearing angle stiffness of the entire hydrodynamic bearing is also increased. In the spindle motor using the hydrodynamic bearing according to the preferred embodiment 2, a rotational precision of the hub can be made high because the bearing stiffness is increased as described above. Further, a hard disk drive with a recording medium mounted on the motor is superior in vibration resistance and durability. Therefore, the hard disk drive is capable of a stable operation in severe environments where a mobile digital device or the like is used such as an intensive vibration, a large temperature variation, an increased stop-start frequency and the like.

It is noted here that, although the flange member and the hub member are different from each other in the embodiment, the flange portion may be formed of a part of the hub member.

Embodiment 3

Figure 6A:
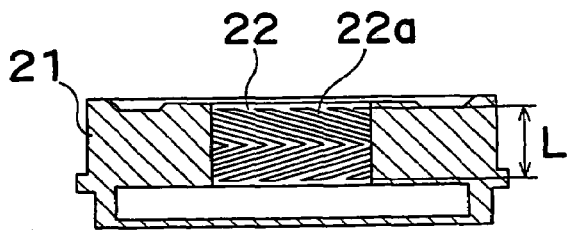
FIG. 6A is a sectional view of a sleeve of a hydrodynamic bearing according to a preferred embodiment 3 of the present invention.
Figure 6B:
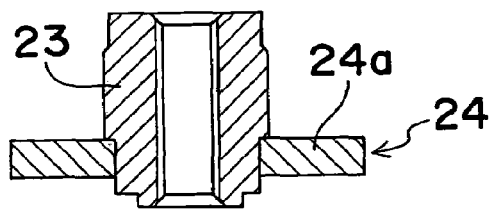
FIG. 6B is a sectional view of a shaft according to the embodiment 3 of the present invention.
Figure 6C:
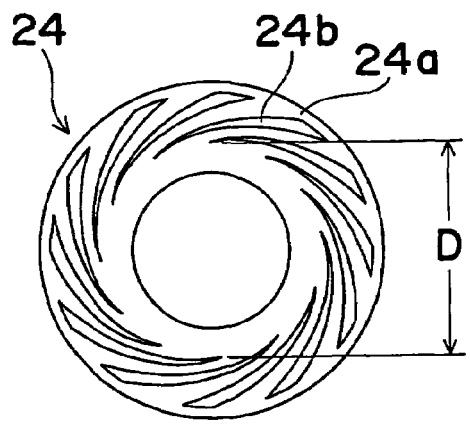
FIG. 6C is a plan view of a flange according to the embodiment 3 of the present invention.

A hydrodynamic bearing according to a preferred embodiment 3 of the present invention is described referring to FIGS. 6A, 6B and 6C. FIG. 6A is a sectional view of a sleeve 21 of the hydrodynamic bearing according to the embodiment 3. A set of radial dynamic pressure generating grooves 22a, each having a herringbone shape, are provided in an inner peripheral surface of a bearing hole 22 formed at a central part of the sleeve 21. A width (i.e., thickness in axial direction) of an entire region of the radial dynamic pressure generating groove 22a is denoted by a reference symbol L.

FIG. 6B is a sectional view of a shaft 23 into which the sleeve 21 is rotatably fitted. A flange 24 is securely attached to a lower part of the shaft 23. FIG. 6C shows an upper surface 24a of the flange 24, and the upper surface 24a has thrust dynamic pressure generating grooves 24b formed therein.

The hydrodynamic bearing according to the preferred embodiment 3 is characterized in that a dimension of a maximal-pressure range D (=R1, also see FIGS. 3A and 3B) where the maximal pressure is generated in the lubricating fluid by the thrust dynamic pressure generating grooves 24b is equal to or larger than the entire width L of the radial dynamic pressure generating groove 22a shown in FIG. 6A (i.e., D≧L). When the maximal-pressure range D is larger than the entire width L, the flange 24 can bear a substantially entire part of the moment load. As a result, the hydrodynamic bearing having a large load bearing capacity against the moment load can be obtained even if the entire width L of the radial dynamic pressure generating groove 22a is reduced. The reduction of the entire width L leads to the reduction of the sleeve 21 in thickness, which consequently leads to reduction of the hydrodynamic bearing in thickness.

It is noted here that, although the flange member and the hub member are different from each other in the embodiment, the flange portion may be formed of a part of the hub member.

Embodiment 4

The preferred embodiments 1 through 3 describe the shaft-fixed type of the hydrodynamic bearing in which the shaft 3 is fixedly secured by the case cover 1 and the base member 2 as shown in FIG. 1. However, the present invention is not limited to this type and can be also applied to a hydrodynamic bearing of a shaft-rotatable type.

Figure 7:
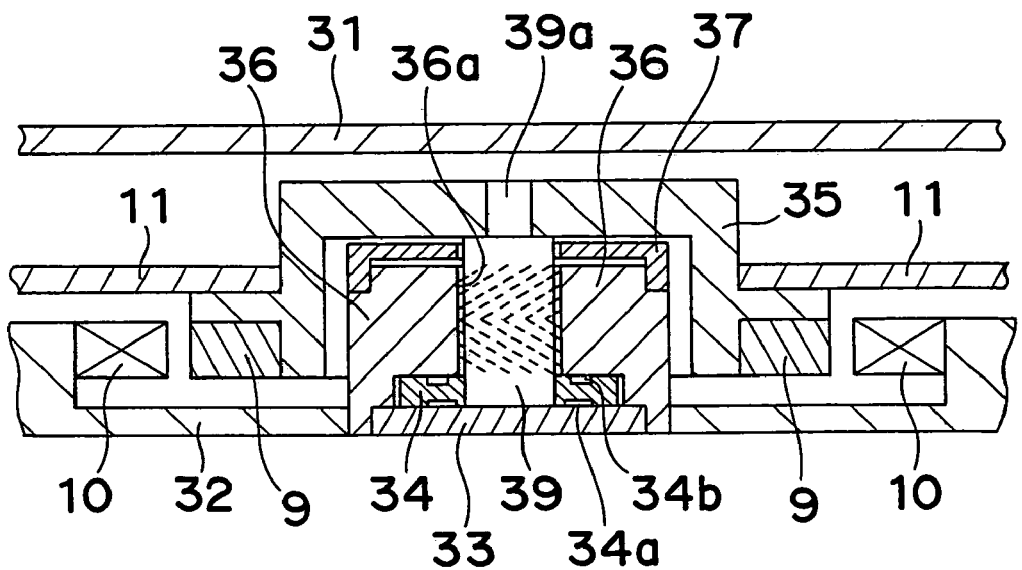
FIG. 7 is a sectional view of a motor including a hydrodynamic bearing of a shaft-rotatable type according to another preferred embodiment of the present invention.

FIG. 7 is a sectional view of a typical motor including a hydrodynamic bearing with a rotatable shaft according to preferred embodiment 4 of the present invention;

In FIG. 7, a sleeve 36 having a counterbore part formed at a lower part thereof is fixed at a central portion of a base member 32. A shaft 39 is rotatably inserted into a bearing hole 36a of the sleeve 36. A flange 34 is attached to a lower end of the shaft 39 and is placed to be housed in the counterbore part of the sleeve 36. A space of the counterbore part including the flange 34 is sealed with a thrust plate 33.

An inner peripheral surface of the bearing hole 36a is provided with any of the radial dynamic pressure generating grooves shown in FIG. 2A, FIG. 4A or FIG. 6A. An upper surface and a lower surface of the flange 34 are provided with any of the thrust dynamic pressure generating grooves shown in FIG. 3A, FIG. 5A or FIG. 6C.

A gap between the shaft 39 and the sleeve 36 and the space of the counterbore part including the flange 34 are filled with the lubricating fluid such as oil, high liquidity grease or ionic liquid.

A hub 35 is mounted on an upper end 39a of the shaft 39, and a recording medium 11 such as a magnetic disk is attached to an outer peripheral part of the hub 35. A case cover 31, only a part thereof is shown in FIG. 7, is provided to entirely cover the motor. A stator core 10 having a coil wound therearound is provided on the base member 32, and a rotor magnet 9 facing the stator core 10 is attached to a lower end of the hub 35. When the coil of the stator core 10 is electrically conducted, the rotor magnet 9 is subjected to a driving force, and is rotated together with the hub 35, shaft 39 and flange 34 integrally rotated. In this construction, it may be possible that the flange is formed of a part of the hub member with the same flange function as described above.

Modified Example

In the preferred embodiments 1 through 3, the radial dynamic pressure generating grooves shown in FIG. 2A may be combined with any of the thrust dynamic pressure generating grooves shown in FIG. 5A so as to constitute the hydrodynamic bearing. If the pitch T1 is equal to or larger than the width L, most of the moment load can be sustained by the flange member. Therefore, a high bearing stiffness of the hydrodynamic bearing can be obtained. Moreover, the radial dynamic pressure generating grooves shown in FIG. 4A may be combined with the thrust dynamic pressure generating grooves shown in FIG. 3A.

If the diameter R1 of the constantly high pressure region of a substantially trapezoidal shape is equal to or larger than the distance R2, most of the moment load can be sustained by the flange member. In this example, the high pressure region R2 of the radial bearing is used as the radial dimension and the high pressure region R1 (=D) of the thrust bearing is used as the thrust dimension, and the same effect as described above can be obtained. That is, the radial dynamic pressure generating grooves and the thrust dynamic pressure generating grooves can be arbitrarily combined, and any combination can achieve the effect of the present invention.

Other Embodiments

Figures 8A, 8B:
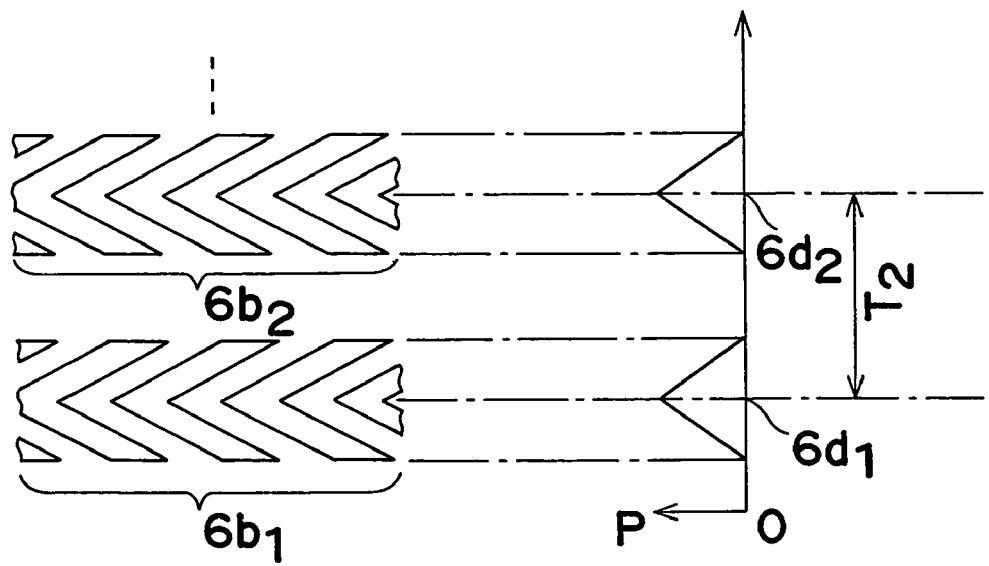
FIG. 8A is a plan view of radial dynamic pressure generating grooves formed in a hydrodynamic bearing according to another preferred embodiment of the present invention.
FIG. 8B is a graph showing a pressure distribution in the hydrodynamic bearing shown in FIG. 8A.

FIGS. 8A and 8B show an example of a spindle motor which is larger than a downsized spindle motor, wherein a radial bearing is provided with plural groups of radial dynamic pressure generating grooves which are denoted by 6b1 and 6b2, each groove having a herringbone shape. In this construction, top positions 6d1 and 6d2 of the generally triangle shapes of the pressure distribution indicate the maximum radial dynamic pressure generating portions, and T2 denotes a pitch between the top positions 6d1 and 6d2. For example, in the case where the radial dynamic pressure generating grooves 6b1 and 6b2 are combined with the thrust dynamic pressure generating grooves as shown in FIG. 3A, if the diameter R1 of the constantly high pressure region of a substantially trapezoidal shape is equal to or larger than the pitch T2, most of the moment load can be sustained by the flange member, and therefore a high bearing angle stiffness of the hydrodynamic bearing can be obtained.

Further, in the case where the radial dynamic pressure generating grooves 6b1 and 6b2 are combined with the thrust dynamic pressure generating grooves as shown in FIG. 5A, if the pitch T1 is equal to or larger than the pitch T2, the same effect can be obtained.

The radial dynamic pressure generating grooves and the thrust dynamic pressure generating grooves according to the present invention are applicable to any hydrodynamic bearing in addition to the hydrodynamic bearings of the embodiments 1 to 4 shown in FIGS. 1A to 7. It is noted here that, in the embodiments described above, although the thrust bearing is provided between the flange member and the sleeve attached to the fixed shaft or rotatable shaft, the present invention is not limited to this, and for example, the thrust bearing may be provided between a lower surface of the hub and an upper surface of the sleeve.

The application of the hydrodynamic bearing to a spindle motor, a high bearing angle stiffness of the spindle motor can be obtained. Moreover, by applying such a spindle motor to a recording and/or reproducing apparatus, the motor can be reduced in size, and the recording and/or reproducing apparatus can be obtained with high portability and reliability as shown in FIG. 9.

Figure 9:
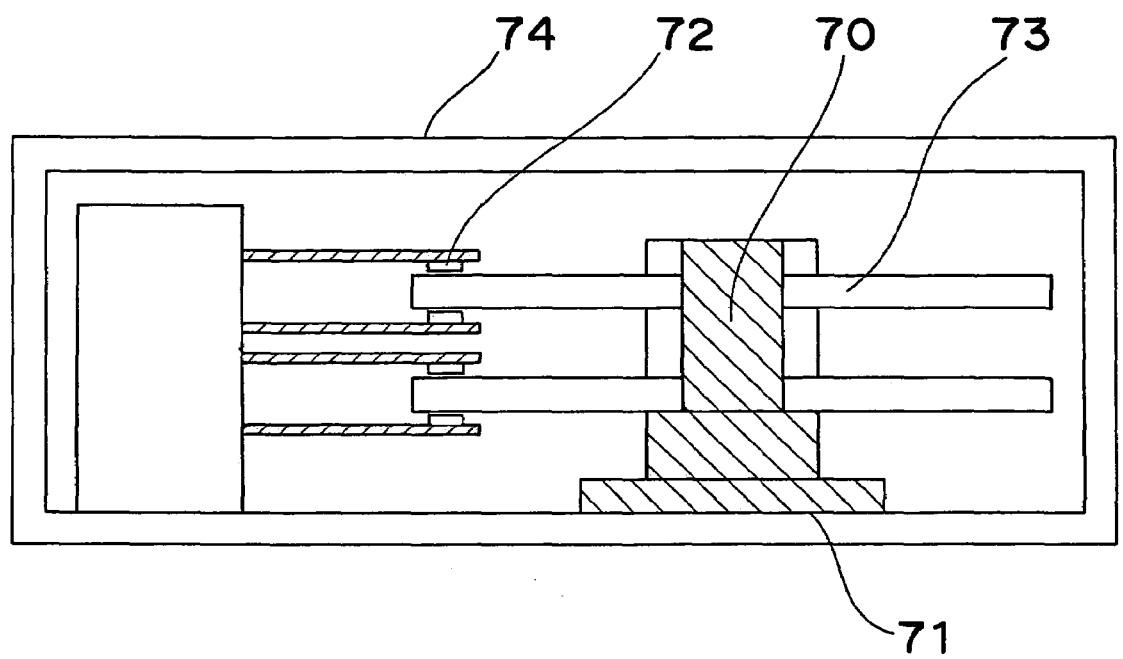
FIG. 9 is a model view in section of a recording and reproducing apparatus using a spindle motor including a hydrodynamic bearing according to the respective preferred embodiments in common of the present invention.

FIG. 9 shows a model of a recording and reproducing apparatus 74 using a spindle motor 71. The spindle motor 71 includes a hydrodynamic bearing 70 according to any one of the preferred embodiments of the present invention, wherein reference numeral 72 denotes a recording head, and 73 denotes a recording disk.

As described above, the application of the radial dynamic pressure generating grooves and the thrust dynamic pressure generating grooves according to the present invention can reduce the hydrodynamic bearing in thickness while still maintaining the high bearing angle stiffness, and consequently reduce the thickness of the motor provided with the hydrodynamic bearing. Thus, the present invention can be utilized in a small-size and thin-shaped motor. When the thin-shaped motor is used in a data recording apparatus such as a hard disk drive, the apparatus can be downsized and thinned with high portability and reliability.

What is claimed is:

1. A hydrodynamic bearing device comprising:
a sleeve having a bearing hole constituting a radial bearing;
a shaft inserted to the bearing hole so as to be rotatable relative to the sleeve;
a flange secured to the shaft and having a surface part facing one end surface of the sleeve proximate the bearing hole, wherein said facing surfaces of the flange and the sleeve are perpendicular to a central axis of the shaft to constitute a thrust bearing; and
a lubricating fluid filled in the bearing hole and a gap between the end surface of the sleeve and the flange,
wherein at least one of an inner surface of the bearing hole and an outer surface of the shaft has radial dynamic pressure generating grooves each having a herringbone shape formed therein so as to generate a radial dynamic fluid pressure having a distribution of a generally triangular shape such that the pressure of the lubricating fluid is maximized at bended portions of the herringbone shapes and gradually reduced toward both ends of the herringbone shapes of the grooves, and
the flange has thrust dynamic pressure generating grooves each having a spiral shape formed in the surface thereof facing said one end surface of the sleeve so as to generate a thrust dynamic fluid pressure having a distribution of a generally trapezoidal shape such that the pressure of the lubricating fluid is high in a region defined by an inner periphery of the grooves and including a vicinity of an inner periphery of the flange and a shaft portion therein and that the pressure is gradually reduced toward an outer periphery of the grooves near an outer periphery of the flange, and
wherein a dimension of the generally trapezoidal pressure distribution where the pressure is increased high by the thrust dynamic pressure generating grooves is equal to or larger than an axial dimension of the radial dynamic pressure generating grooves.

2. The hydrodynamic bearing device according to claim 1 further comprising a hub member which is mounted on an outer periphery of the sleeve, wherein a part of the hub member constitutes the flange.

3. The hydrodynamic bearing device as claimed in claim 1, wherein a dimension of the generally trapezoidal pressure distribution where the thrust dynamic pressure is increased high by the thrust dynamic pressure generating grooves is equal to or larger than a dimension of a pitch between tops of the generally triangular pressure distribution where the radial dynamic pressure is increased high by the radial dynamic pressure generating grooves.

4. A spindle motor including the hydrodynamic bearing device as claimed in claim 1.

5. A recording and reproducing apparatus including the spindle motor as claimed in claim 4.

6. A hydrodynamic bearing device comprising:
a sleeve having a bearing hole constituting a radial bearing;
a shaft inserted to the bearing hole so as to be rotatable relative to the sleeve;
a flange secured to the shaft and having a surface part facing one end surface of the sleeve proximate the bearing hole, wherein said facing surfaces of the flange and the sleeve are perpendicular to a central axis of the shaft to constitute a thrust bearing; and
a lubricating fluid filled in the bearing hole and a gap between the end surface of the sleeve and the flange,
wherein at least one of an inner surface of the bearing hole and an outer surface of the shaft has radial dynamic pressure generating grooves each having a herringbone shape formed therein so as to generate a radial dynamic fluid pressure having a distribution of a generally triangular shape such that the pressure of the lubricating fluid is maximized at bended portions of the herringbone shapes and gradually reduced toward both ends of the herringbone shapes of the grooves, and the flange has thrust dynamic pressure generating grooves each having a herringbone shape formed in the surface thereof facing said one end surface of the sleeve so as to generate a thrust dynamic fluid pressure having a distribution of an annular shape with a generally triangular shape in section such that the pressure of the lubricating fluid is maximized at bended portions of the herringbone shapes of the grooves between said one end surface of the sleeve and the flange and gradually reduced toward both ends of the herringbone shapes of the grooves, and wherein a dimension of the generally triangular pressure distribution where the pressure is increased high by the thrust dynamic pressure generating grooves is equal to or larger than an axial dimension of the radial dynamic pressure generating grooves.

7. The hydrodynamic bearing device according to claim 6 further comprising a hub member which is mounted on an outer periphery of the sleeve, wherein a part of the hub member constitutes the flange.

8. The hydrodynamic bearing device as claimed in claim 6, wherein a diameter defined by a pitch between tops of the generally triangular pressure distribution where the thrust dynamic pressure is increased high by the thrust dynamic pressure generating grooves is equal to or larger than a pitch defined between tops of the generally triangular pressure distribution where the radial dynamic pressure is increased high by the radial dynamic pressure generating grooves.

9. A spindle motor including the hydrodynamic bearing device as claimed in claim 6.

10. A recording and reproducing apparatus including the spindle motor as claimed in claim 9.

11. A hydrodynamic bearing device comprising:
a sleeve having a bearing hole constituting a radial bearing;
a shaft inserted to the bearing hole so as to be rotatable relative to the sleeve;
a flange secured to the shaft and having a surface part facing one end surface of the sleeve proximate the bearing hole, wherein said facing surfaces of the flange and the sleeve are perpendicular to a central axis of the shaft to constitute a thrust bearing; and
a lubricating fluid filled in the bearing hole and a gap between the end surface of the sleeve and the flange,
wherein at least one of an inner surface of the bearing hole and an outer surface of the shaft has a pair of first and second groups of a plurality of radial dynamic pressure generating grooves, said first and second groups being apart from each other by a space region, wherein said radial dynamic pressure grooves of the first group are formed in parallel with each other and tilted in a predetermined direction and said radial dynamic pressure generating grooves of the second group are formed in parallel with each other and tilted in a direction reverse to the tilting direction of the first group, so that a radial dynamic fluid pressure having a distribution of a generally trapezoidal shape is generated such that the pressure of the lubricating fluid between the inner surface of the bearing hole and the outer surface of the shaft is constantly high in the space region in an axial direction and is gradually reduced toward the both ends thereof, and the flange has thrust dynamic pressure generating grooves each having a spiral shape formed in the surface thereof facing said one end surface of the sleeve, so that a thrust dynamic fluid pressure having a distribution of a generally trapezoidal shape is generated such that the pressure of the lubricating fluid is constantly the highest in a region defined by an inner periphery of the grooves and including a vicinity of an inner periphery of the flange and a shaft portion therein and that the pressure is gradually reduced toward an outer periphery of the grooves near an outer periphery of the flange, and wherein a dimension of the generally trapezoidal pressure distribution where the thrust dynamic pressure is increased high by the thrust dynamic pressure generating grooves is equal to or larger than a dimension of the generally trapezoidal pressure distribution where the radial dynamic pressure is increased high by the radial dynamic pressure generating grooves.

12. The hydrodynamic bearing device according to claim 11 further comprising a hub member which is mounted on an outer periphery of the sleeve, wherein a part of the hub member constitutes the flange.

13. The hydrodynamic bearing device as claimed in claim 11, wherein a dimension of the generally trapezoidal pressure distribution where the pressure is increased high by the thrust dynamic pressure generating grooves is equal to or larger than an axial dimension of the radial dynamic pressure generating grooves.

14. A spindle motor including the hydrodynamic bearing device as claimed in claim 11.

15. A recording and reproducing apparatus including the spindle motor as claimed in claim 14.

16. A hydrodynamic bearing device comprising:
a sleeve having a bearing hole constituting a radial bearing;
a shaft inserted to the bearing hole so as to be rotatable relative to the sleeve;
a flange secured to the shaft and having a surface part facing one end surface of the sleeve proximate the bearing hole, wherein said facing surfaces of the flange and the sleeve are perpendicular to a central axis of the shaft to constitute a thrust bearing; and
a lubricating fluid filled in the bearing hole and a gap between the end surface of the sleeve and the flange,
wherein at least one of an inner surface of the bearing hole and an outer surface of the shaft has a pair of first and second groups of a plurality of radial dynamic pressure generating grooves, said first and second groups being apart from each other by a space region, wherein said radial dynamic pressure grooves of the first group are formed in parallel with each other and tilted in a predetermined direction and said radial dynamic pressure generating grooves of the second group are formed in parallel with each other and tilted in a direction reverse to the tilting direction of the first group, so that a radial dynamic fluid pressure having a distribution of a generally trapezoidal shape is generated such that the pressure of the lubricating fluid between the inner surface of the bearing hole and the outer surface of the shaft is constantly high in the space region in an axial direction and is gradually reduced toward the both ends thereof, and the flange has thrust dynamic pressure generating grooves each having a herringbone shape formed in the surface thereof facing said one end surface of the sleeve so as to generate a thrust dynamic fluid pressure having a distribution of a generally triangular shape such that the pressure of the lubricating fluid is maximized at bended portions of the herringbone shapes of the grooves between said one end surface of the sleeve and the flange and is gradually reduced toward both ends of the herringbone shapes of the grooves, and wherein a diameter defined by a pitch between tops of the generally triangular pressure distribution where the thrust dynamic pressure is increased high by the thrust dynamic pressure generating grooves is equal to or larger than a dimension of the generally trapezoidal pressure distribution where the radial dynamic pressure is increased high by the radial dynamic pressure generating grooves.

17. The hydrodynamic bearing device according to claim 16 further comprising a hub member which is mounted on an outer periphery of the sleeve, wherein a part of the hub member constitutes the flange.

18. A spindle motor including the hydrodynamic bearing device as claimed in claim 16.

19. A recording and reproducing apparatus including the spindle motor as claimed in claim 18.

* * * * *